United States Patent [19]

Fournier

[11] Patent Number: 4,563,795
[45] Date of Patent: Jan. 14, 1986

[54] CONDUIT CLAMP

[75] Inventor: Paul J. E. Fournier, Jackson, Mich.

[73] Assignee: Aeroquip Corporation, Jackson, Mich.

[21] Appl. No.: 662,612

[22] Filed: Oct. 19, 1984

[51] Int. Cl.⁴ .............................................. B65D 63/00
[52] U.S. Cl. ........................................ 24/19; 24/268; 24/279
[58] Field of Search ............... 24/268, 19, 20 LS, 279, 24/280, 281, 282; 248/73

[56] References Cited

U.S. PATENT DOCUMENTS

| | | | |
|---|---|---|---|
| 2,555,378 | 6/1951 | Shuter | 24/19 |
| 2,616,644 | 11/1952 | Christophersen | 24/19 X |
| 2,665,094 | 1/1954 | Christophersen | 24/19 X |
| 2,969,214 | 1/1961 | Torrensen | 24/19 X |
| 3,097,820 | 7/1963 | Castle | 24/19 X |

FOREIGN PATENT DOCUMENTS

| | | | |
|---|---|---|---|
| 1109959 | 6/1961 | Fed. Rep. of Germany | 24/268 |
| 700226 | 11/1953 | United Kingdom | 24/19 |

Primary Examiner—William E. Lyddane
Assistant Examiner—Laurie K. Cranmer
Attorney, Agent, or Firm—Beaman & Beaman

[57] ABSTRACT

The invention pertains to a conduit clamp utilizing a band circumferentially contractable by a screw substantially parallel to the axis of the conduit being clamped. The clamp components are formed of castings and heavy duty construction techniques whereby high circumferential forces can be produced without damage to the clamp.

5 Claims, 12 Drawing Figures

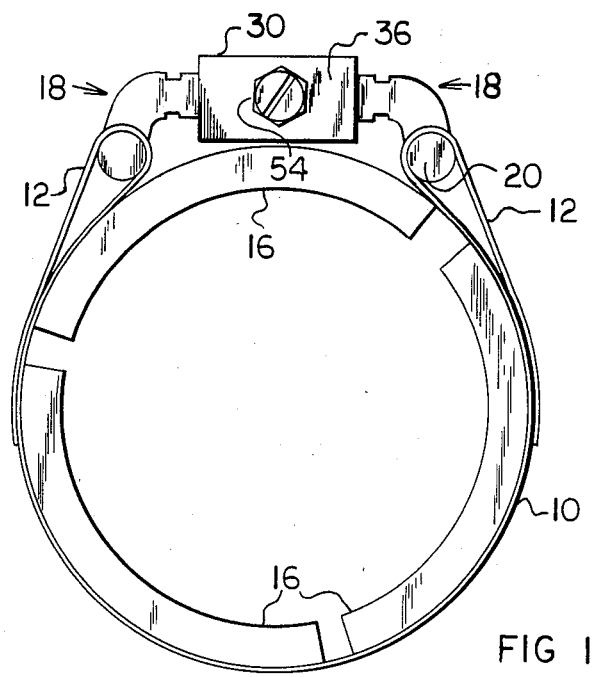
FIG 1
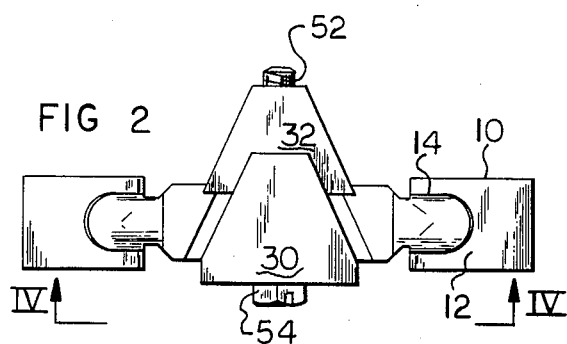
FIG 2  FIG 3
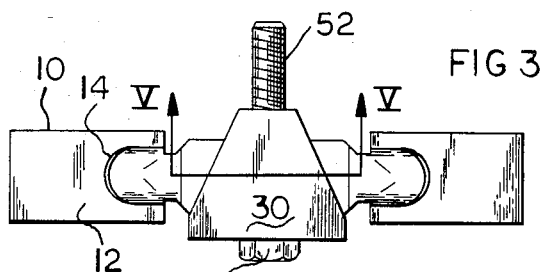
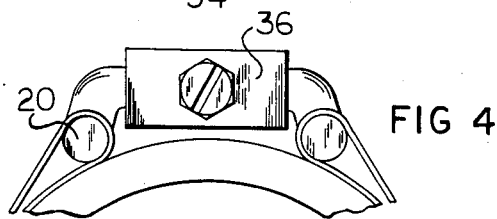
FIG 4
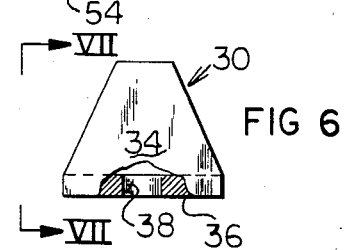
FIG 6
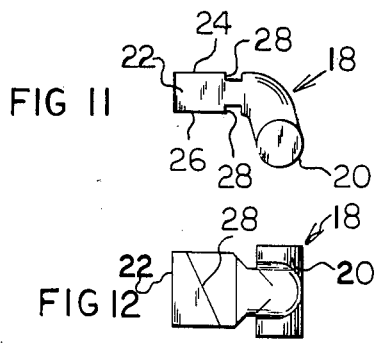
FIG 11
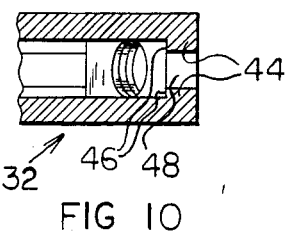
FIG 10
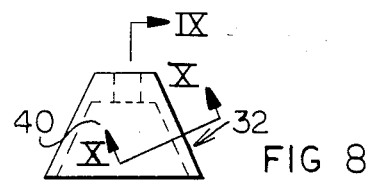
FIG 7
FIG 12
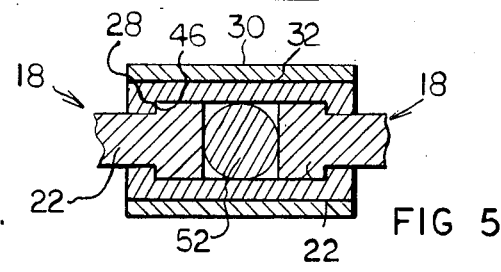
FIG 5
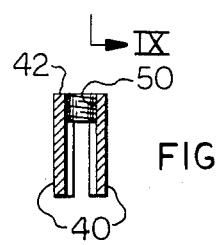
FIG 8
FIG 9

CONDUIT CLAMP

BACKGROUND OF THE INVENTION

Circumferential conduit and hose clamps commonly employ flexible bands circumferentially contractable to impose a uniform radial contraction upon the conduit or hose. Such clamps take a variety of forms, and are often actuated by a bolt, screw or similar threaded actuator rotatable about an axis perpendicularly disposed to the axis of the hose being clamped. As the screwdriver or wrench which is employed to rotate the actuator is usually aligned with the actuator, considerable radial clearance is required adjacent the conduit or hose being clamped to permit use of this type of clamp.

Hose clamps have been designed of the contractable band-screw actuated type wherein the axis of the actuating screw is disposed substantially parallel to the axis of the hose being clamped. Such clamps permit operation in installations wherein limited radial clearance adjacent the hose is available. This type of clamp may use cam surfaces displaceable upon rotation of the actuator screw to produce a circumferential force to tension and contract the band. Clamps of this type are usually of relatively inexpensive nature and utilize stamped sheet metal components. Typical examples of known prior art clamps of the aforementioned construction are shown in U.S. Pat. Nos. 2,627,635; 2,778,085; 2,803,866 and 2,922,212.

Clamps of the aforementioned type utilizing sheet metal components are acceptable for light duty applications wherein limited circumferential forces are required to constrict the band. However with larger diameter hose, and higher pressure fluid systems requiring higher circumferential forces in the clamp, known hose clamps of this type are often damaged due to over-torqueing of the screw actuator.

It is an object of the invention to provide a conduit or hose clamp utilizing a screw actuator capable of tensioning a circumferential band wherein the clamp components are of a high strength, rugged and heavy duty character capable of preventing damage due to over-torqueing of the screw actuator.

A further object of the invention is to provide a high strength hose clamp utilizing a screw actuator disposed substantially parallel to the axis of the hose being clamped, and wherein the engaging force generating components are forged or cast, and are of such construction as to resist deformation during clamp operation.

In the practice of the invention, a flexible tension band has loops defined at each end thereof. Cast or preformed solid band anchors are affixed to each end of the band by means of cylindrical heads engaged within the loops defined at the band end. The association of the loops and cylindrical heads prevents localized stresses being imposed upon the band by the band anchors.

The band anchors are received within a U-shaped bracket in which a threaded actuator is rotatably supported. The band anchors include cam surfaces obliquely disposed to the length of the screw actuator, and a slide receivable within the bracket includes cam surfaces engaging the band anchor cam surfaces whereby rotation of the actuator causes the band anchors to be drawn into the bracket to contract the band. As the outer ends of the band anchors, and the slide, are all located within the bracket, an attractive clamp is provided wherein the basic components are relatively protected.

By forming the band anchors, bracket and slide by heavy duty, high strength techniques, such as by casting, forging or the like, the clamp components are capable of resisting the forces imposed thereon during tightening of the clamp, and the clamp components are not damaged which precludes inadvertent unloosening and permits reuse.

BRIEF DESCRIPTION OF THE DRAWINGS

The aforementioned objects and advantages of the invention will be appreciated from the following description and accompanying drawings wherein:

FIG. 1 is an end assembly view of a clamp in accord with the invention,

FIG. 2 is a top plan view of the clamp prior to tightening,

FIG. 3 is a top plan view similar to FIG. 2 illustrating the clamp components in the tightened relationship, FIG. 4 is a side, elevational, detail view as taken along Section IV—IV of FIG. 2, FIG. 5 is an elevational, sectional view of the assembled bracket and slide as taken along Section V—V of FIG. 3, FIG. 6 is a top plan view of the bracket, per se, FIG. 7 is a side view of the bracket as taken along Section VII—VII of FIG. 6, FIG. 8 is a plan view of the clamp slide, FIG. 9 is an elevational, sectional view of the slide as taken along Section IX—IX of FIG. 8, FIG. 10 is a detail, sectional view as taken along Section X—X of FIG. 8, FIG. 11 is a side, elevational view of a band anchor, per se, and FIG. 12 is a top plan view of the band anchor of FIG. 11.

DESCRIPTION OF THE PREFERRED EMBODIMENT

The basic components of the clamp in accord with the invention will be appreciated from FIGS. 1 and 2. The clamp includes a flexible metal band 10 having ends defined by loops 12. The ends of the loops are formed with elongated slots 14 for receiving the heads of the band anchors, as later described. In FIG. 1, three circular segments 16 are illustrated as circumscribed by the clamp and band. The segments 16 may be affixed to the inside of the band, or may include an outer recess receiving the band, or may represent the conduit or hose structure being clamped. It will therefore be appreciated that the segments represent structure which is radially contracted upon tightening of the clamp.

A band anchor 18 is associated with each loop defined at the ends of the band. The anchors are mirror images of each other, and each includes a band attachment end defined by a cylindrical head 20 inserted through the associated loop slot 14 for engagement with the inside of the loop which prevents localized stress points between the anchor and loop.

The outer end of the band anchors include a generally rectangular head 22 having an outer side 24 and an inner side 26. Each of the sides includes an obliquely disposed shoulder constituting a cam surface 28, the cam surfaces on the outer and inner side being aligned to lie on the same plane. As will be appreciated from FIG. 2, the cam surfaces 28 are obliquely related to the axis of the anchor cylindrical head 20, and hence are obliquely disposed to the axis of the band 10.

The apparatus for constricting the band includes a U-shaped bracket 30 and a slide 32 which associates with the band anchors. The bracket 30, as will be appreciated from FIGS. 6 and 7, is of a U-configuration having parallel spaced legs 34 connected by a base region 36. The base region includes a hole 38 through which the screw actuator extends, as later described. The spacing between the legs 34 is sufficient to receive the anchor heads 22 therebetween.

The slide 32 is of a truncated V-configuration including outer and inner spaced parallel sides 40 interconnected by a base region 42. As will be appreciated in FIG. 10, the sides 40 include inwardly extending flanges 44 which are obliquely oriented to each other converging in the direction of the base region and internally provided with linear shoulders constituting cam surfaces 46. The cam surfaces 46 of opposed flanges are aligned to lie in the same plane, and the angle thereof is complementary to the cam surfaces 28 of the band anchors. The spacing 48 between opposed flanges 44 is sufficient to receive the head 22 of the band anchors 18 therebetween, and the spacing of the slide sides 40 is such as to be receivable between the legs 34 of the bracket 30.

The base region 42 is provided with a threaded opening 50 for cooperation with the threaded screw or bolt 52 which rotatably extends through the bracket opening 38, and accordingly, as the bolt 52 is rotated by means of a wrench or screwdriver engaging the hexagonal bolt head 54 the relative relationship between the brackets 30 and slide 32 may be adjusted as apparent in FIGS. 2 and 3.

The assembly of the band anchors, bracket and slide will be appreciated from FIGS. 2-5. The band anchor heads 22 are received within the slide 32 such that the cam surfaces 28 will engage the cam surfaces 46. This subassembly is located between the legs 34 of the bracket 30, and the bolt 52 is inserted through hole 38 and threaded into opening 50 to maintain the assembly of components.

In use, the bolt 52 is rotated counterclockwise, FIG. 4, to extend the slide 32 as shown in FIG. 2. This relationship of the slide and band anchors permits the band anchors 18 to be separated the maximum extent opening the band 10 and permitting the band to be located as desired upon the conduit or hose with which the clamp is associated. Thereupon, a wrench or screwdriver, not shown, is applied to the head 54 and clockwise rotation of the bolt draws the slide 32 toward the bracket base 36. This action causes the cam surfaces 46 to slide upon the band anchor cam surfaces 28 drawing the band anchors toward each other and constricting the band producing the desired clamping action. Rotation of the bolt 52 continues until the desired clamping force is achieved.

As the bolt 52 is rotated about an axis substantially parallel to the axis defined by the band 10, and the conduit clamped thereby, a clamp in accord with the invention may be operated in locations having limited clearance in that the screwdriver or wrench being used to rotate the bolt is disposed adjacent the conduit.

The band anchor, bracket and slide are preferably formed by cast or forging methods whereby the strength of these components is high, and these components are able to withstand high clamping forces as imposed thereon by the operation of the bolt 52 without damage. The disclosed construction of the components lends itself to this high strength manufacture, and a clamp of this type will not fail during repeated use, as is the case with clamps formed of sheet metal components.

It is appreciated that various modifications to the inventive concepts may be apparent to those skilled in the art without departing from the spirit and scope of the invention.

I claim:

1. A circumferential conduit clamp operable by an actuator rotatable about an axis substantially parallel to the longitudinal axis of the conduit being clamped and characterized by its high strength and heavy duty construction comprising, in combination, a generally circular flexible tension band defining a central longitudinal axis and having ends, a rigid band anchor attached to each band end, said anchors being disposed adjacent to and displaceable toward each other, each anchor including a band attachment end attached to a band end and an outer end, said anchor outer ends each comprising an enlarged head having a radially inwardly facing side and a radially outwardly facing side, a radially extending first cam surface defined upon each head side, said cam surfaces being radially aligned and obliquely disposed to the length of said band axis, a U-shaped bracket having a base and parallel spaced legs extending from said base, said anchor heads being movably located between said bracket legs, a rigid slide receivable between said bracket legs, second cam surfaces defined upon said slide adjacent with an engaging said first cam surfaces, and a slide actuator mounted upon said bracket selectively translating said slide within said bracket to move said second cam surfaces across said first cam surfaces to draw said band anchors toward each other and contract said band.

2. In a conduit clamp as in claim 1, said slide actuator comprising a screw having a torque transmitting head.

3. In a conduit clamp as in claim 1, said band anchors and slide being formed of cast metal.

4. In a conduit clamp as in claim 3, said band anchor band attachment end including a cylindrical portion receiving a loop defined upon the band end.

5. In a conduit clamp as in claim 3, said slide comprising a V-shaped member having flat sides, each side having inwardly extending flanges defining second cam surfaces, a base defined upon said slide bridging said sides, said actuator engaging said base.

* * * * *